US007776931B2

(12) United States Patent
Venter et al.

(10) Patent No.: US 7,776,931 B2
(45) Date of Patent: *Aug. 17, 2010

(54) LOW DOSAGE NAPHTHENATE INHIBITORS

(75) Inventors: Petrus Johannes Venter, Pearland, TX (US); Vaughn M. Nace, Lake Jackson, TX (US); Sen J. Ubbels, Delden (NL)

(73) Assignee: Champion Technologies, Inc., Houston, TX (US)

( * ) Notice: Subject to any disclaimer, the term of this patent is extended or adjusted under 35 U.S.C. 154(b) by 1432 days.

This patent is subject to a terminal disclaimer.

(21) Appl. No.: 10/944,288

(22) Filed: Sep. 17, 2004

(65) Prior Publication Data

US 2005/0282711 A1    Dec. 22, 2005

Related U.S. Application Data

(63) Continuation-in-part of application No. 10/869,826, filed on Jun. 16, 2004.

(51) Int. Cl.
| | |
|---|---|
| B01D 17/05 | (2006.01) |
| C09K 8/524 | (2006.01) |
| E21B 37/06 | (2006.01) |
| B01F 17/14 | (2006.01) |
| C09K 8/60 | (2006.01) |

(52) U.S. Cl. .................................. 516/145; 507/90
(58) Field of Classification Search .................. 516/145; 507/90
See application file for complete search history.

(56) References Cited

U.S. PATENT DOCUMENTS

| | | | |
|---|---|---|---|
| 2,143,991 A | 1/1939 | Loomis | |
| 4,192,767 A | 3/1980 | Flournoy | |
| 4,384,977 A * | 5/1983 | Duke | 516/163 |
| 4,396,530 A * | 8/1983 | Duke | 516/179 |
| 4,446,002 A | 5/1984 | Siegmund | |
| 4,514,322 A * | 4/1985 | Swoboda | 252/519.33 |
| 4,846,957 A | 7/1989 | Johnson et al. | |
| 5,008,026 A * | 4/1991 | Gardner et al. | 507/235 |
| 5,092,405 A * | 3/1992 | Prukop | 507/225 |
| 5,112,505 A | 5/1992 | Jacobs et al. | |
| 5,130,473 A | 7/1992 | Jacobs et al. | |
| 5,156,675 A * | 10/1992 | Breton et al. | 106/31.43 |
| 5,213,691 A | 5/1993 | Emmons et al. | |
| 5,252,254 A | 10/1993 | Babaian-Kibala | |
| 5,283,235 A * | 2/1994 | Bush et al. | 507/118 |
| 5,420,040 A | 5/1995 | Anfindsen et al. | |
| 5,425,422 A | 6/1995 | Jamaluddin et al. | |
| 5,482,484 A * | 1/1996 | Askestad | 441/5 |
| 5,500,107 A * | 3/1996 | Edmondson | 208/47 |
| 5,552,085 A | 9/1996 | Babaian-Kibala | |
| 5,863,415 A | 1/1999 | Zetlmeisl | |
| 5,948,237 A | 9/1999 | Miller et al. | |
| 5,969,237 A | 10/1999 | Jones et al. | |
| 5,985,137 A * | 11/1999 | Ohsol et al. | 208/263 |
| 6,051,535 A | 4/2000 | Bilden et al. | |
| 6,225,263 B1 * | 5/2001 | Collins et al. | 507/261 |
| 6,294,093 B1 | 9/2001 | Selvarajan et al. | |
| 6,547,957 B1 * | 4/2003 | Sudhakar et al. | 208/111.01 |
| 6,716,358 B2 | 4/2004 | Varadaraj | |
| 2004/0072361 A1 | 4/2004 | Varadaraj et al. | |

FOREIGN PATENT DOCUMENTS

| | | | |
|---|---|---|---|
| CA | 2029465 | | 5/1991 |
| CA | 2277052 | | 7/1998 |
| CA | 2 386 314 | | 4/2001 |
| CA | 2386721 | | 4/2001 |
| CA | 2455854 | | 2/2003 |
| GB | 2337522 A | | 11/1999 |
| WO | WO 98/30784 | * | 7/1998 |
| WO | WO 01/27438 | * | 4/2001 |

(Continued)

OTHER PUBLICATIONS

Lewis, Richard J., Sr. (2002). Hawley's Condensed Chemical Dictionary (14th Edition). (pp: ). John Wiley & Sons. Online version available at: http://knovel.com/web/portal/browse/display?_EXT_KNOVEL_DISPLAY_bookid=704&VerticalID=0 , Entry: "cation", "amphiphilic", "surface active agent", and "surfactant". pp. 1-8.*
Copyright © Webster's Third New International Dictionary, Unabridged, Copyright © 1993 Merriam-Webster.Published under license from Merriam-Webster,Incorporated, http://lionreference.chadwyck.com/searchFulltext.do?id=17573917&idType=offset&divLevel=2&queryId=../session/1247850186_24135&area=mwd&forward=refshelf&trail=refshelf , Headword: "inhibit".*
Schlumberger Oilfield Glossary, @ http://www.glossary.oilfield.slb.com/Display.cfm?Term=production, "raw crude oil", "nonhydrocarbon contaminants", "emulsion", and "brine" (Jul. 2009).*

(Continued)

*Primary Examiner*—Daniel S Metzmaier
(74) *Attorney, Agent, or Firm*—Jeffrey L. Streets; Streets & Steele

(57) ABSTRACT

Low dosage naphthenate inhibitors, such as a surfactant or hydrotrope, delivered into production fluids for contact with mixtures of oil and water, such as in a hydrocarbon producing formation, production equipment, or processing systems. Inhibitor compounds such as monophosphate esters and diphosphate esters exhibit surface-active properties that cause the inhibitors to self-associate at oil-water interfaces and inhibit interactions between organic acids in the oil with cations or cation complexes in the water. These compounds also inhibit aggregation of organic acid carboxylate salts that form when pH and pressure conditions are amenable to organic acid ionization. Preferred inhibitors do not form emulsions due to the formation of unstable mixed interface structures that result in coalescence of dispersed droplets. Naphthenate inhibitor compound dosages of less than 100 ppm can effectively inhibit naphthenate salts or other organic acid salts that can form precipitates or emulsions during crude oil production or processing.

82 Claims, 1 Drawing Sheet

FOREIGN PATENT DOCUMENTS

| | | | |
|---|---|---|---|
| WO | WO 01/29370 | * | 4/2001 |
| WO | WO 03/012253 A3 | * | 2/2003 |

OTHER PUBLICATIONS

Schlumberger Oilfield Glossary, @ http://www.glossary.oilfield.slb.com/Display.cfm?Term=production, "demulsifier" (Oct. 2009).*

Trond Erik Havre; "Formation of Calcium Naphthenate in Water/Oil Systems, Naphthenic Acid Chemistry and Emulsion Stability"; Department of Chemical Engineering Norwegian University of Science and Technology; pp. 1-64; Oct. 2002.

Inge Harald Auflem; "Influence of Asphaltene Aggregation and Pressure on Crude Oil Emulsion Stability"; Department of Chemical Engineering Norwegian University of Science and Technology; pp. 1-51; Jun. 2002.

PCT International Search Report—Mar. 1, 2006.

Poggesi et al. "Multifunction Chemicals for West African Deep Offshore Fields", SPE 74649, Jan. 2002, pp. 1-6.

Vindstad, et al. "Fighting Naphthenate Deposition at the Heidrun Field", SPE80375, Jan. 2003, pp. 1-7.

Goldszal et al. "Scale and Naphthenate Inhibition in Deep-Offshore Fields" SPE 74661, Jan. 2002, pp. 1-11.

Gallup et al. "Formation & Mitigation of 'Metallic Soap' Sludge, Attaka, Indonesia Field" SPE 73960, Unocal Indonesia, Mar. 2002, pp. 1-16.

T.G. Balson "Something Old, Something New: A Discussion about Demulsifiers" pp. 226-238; Chemistry in the Oil Industry VIII Nov. 3-5, 2003, Manchester Conference Centre, UK, 3 page Programme.

Ogden, P.H. "Chemicals in the Oil Industry: Developments and Applications", Akzo Chemie UK Ltd, Royal Society of Chemistry, 3 pages, (copyright 1991).

EPO "Communication of a notice of opposition" Sep. 30, 2009, pp. 1-5. (including English translation).

* cited by examiner

LOW DOSAGE NAPHTHENATE INHIBITORS

This application is a continuation-in-part of U.S. patent application Ser. No. 10/869,826 filed on Jun. 16, 2004.

BACKGROUND OF THE INVENTION

1. Field of the Invention

The present invention relates to methods and compositions for inhibiting the formation of naphthenate precipitates or naphthenate-stabilized emulsions during contact between crude oil containing naphthenic acid and water containing cations.

2. Description of the Related Art

Crude oil includes various high molecular weight hydrocarbon-containing compounds, frequently including naphthenic acid. Naphthenic acids are classified as carboxylic acids of the general formula R—COOH, where R represents a cyclo-aliphatic structure typically having 10 to 50 carbon atoms and 0 to 6 rings. The term "naphthenic acid" is generally used to account for carboxylic acids present in crude oil, including acyclic and aromatic acids. Naphthenic acids are found predominantly in immature biodegraded crude oils. The amount of organic acid present in crude oil is expressed by the total acid number (TAN), often in units of milligrams KOH per gram of crude. For example, crude oil produced from the North Sea, the Far East and Western Africa exhibit high TAN numbers, such as a TAN greater than one (1), including high concentrations of naphthenic acids.

One problem experienced during production of crude oils having a high TAN number, is the formation of calcium naphthenate precipitates and/or naphthenate stabilized emulsions. The ionizable carboxylic acid group present in naphthenic acids exhibits a hydrophilic nature that causes the naphthenic acid molecule to congregate at the oil-water interface. At low pH conditions, the interfacial activity of the naphthenic acids is not so problematic because the predominant species is the charge-neutral carboxylic acid. As the crude oil is produced, the pressure in the crude oil drops and carbon dioxide is lost from the solution. The loss of carbon dioxide causes the pH of the crude oil to increase and, in turn, leads to enhanced dissociation of the naphthenic acid. The naphthenates can then act as natural surfactants leading either to stabilized emulsions or solid deposits following complexation with calcium or other cations present in the aqueous phase. The naphthenate deposits can accumulate in flowlines, heat-exchangers, oil-water separators, desalters, filters, hydro-cyclones, and other oil processing equipment.

When naphthenic acids in crude oil are combined with high-pH, highly mineralized connate or process waters, the processes that separate oil and water can experience severe problems. The neutralization products of naphthenic acids with basic ions in the water tend to form very stable water-in-oil emulsions and/or insoluble sticky calcium naphthenate deposits. The naphthenate deposits are similar in nature to lime soaps that form from fatty carboxylates and calcium chloride, sometimes known as "soap scum." These phenomena can hamper the oil production considerably and result in high treatment costs.

Existing treatments to prevent the formation of calcium naphthenate precipitates and emulsions during oil production include the injection of large volumes of acetic acid in order to decrease the pH of the oil and water phases, thus favoring naphthenic acid over the formation of naphthenate salts. However, to accomplish this task requires continuous injection of about 100 to 1000 parts per million (ppm) of acetic acid to achieve a pH below at least 6.0 and sometimes even below 5.2. However, this acid is very corrosive and presents various health, safety, and environmental issues. Furthermore, the sheer volume of acetic acid solution that is necessary represents a significant storage and supply problem, especially on offshore oil production platforms. Also, lowering the pH of the produced waters may lead to serious internal corrosion of the crude oil processing equipment. The result is that preventing the formation of naphthenate precipitates and emulsions comes at a high cost.

Therefore, there is a need for an improved method of inhibiting the formation of naphthenate precipitates and emulsions during the production of crude oil. There is also a need for a composition or formulation that is more effective at inhibiting naphthenate precipitates and emulsions. Furthermore, there is a need for a composition that is effective in mitigating the deleterious effects of any metal naphthenate salt aggregates that do form, by acting to stabilize the crystallites and preventing further agglomeration that would lead to deposit formation. It would be desirable if the method and composition required smaller volumes of active chemical, lower dosage rates, smaller pH changes, and lower overall costs.

SUMMARY OF THE INVENTION

The present invention provides a method comprising adding an inhibitor composition to a mixture of water and oil in an amount that is effective to inhibit interaction between cations in the water and organic acid in the oil. The cations originating from the water, such as connate water, formation water or seawater, may include an inorganic cationic species. Examples of a cationic species include from calcium cations, magnesium cations, sodium cations, or combinations thereof. The organic acid originating from the oil may include a naphthenic acid. The inhibitor compositions are suitable for use with oil having a total acid number (TAN) greater than 0.05 and even a TAN greater than 1. Preferably, the inhibitor composition is effective to inhibit formation of organic salts.

Should any metal naphthenate salts already exist prior to adding the inhibitor or form despite the presence of the inhibitor, the inhibitor composition may additionally inhibit the agglomeration of these reaction products of metal ions and organic acids in the oil via crystal habit modification. The term "crystal habit" refers to the typical course of events that occur when a material becomes insoluble by forming a specific type of crystal structure. One type of crystal habit modification can be brought about by adding inhibitor molecules that interfere with crystallization to the extent that the crystals are unstable, do not agglomerate, and therefore do not form deposits on oil production equipment.

The inhibitor composition may also be in the form of an acid that will reduce the dissociation of the naphthenic acid to some extent, although this is not the primary mechanism by which the inhibitor functions. Still, acidification may play a role in the overall inhibition of organic salt deposits and emulsions.

In one embodiment, the inhibitor composition inhibits the cations and organic acid, such as a naphthenic acid, from interacting along an oil-water interface, such as an oil-water emulsion. Preferably, the inhibitor composition inhibits formation of an organic salt, such as a naphthenate salt, along an oil-water interface. More specifically and preferably, the inhibitor composition inhibits naphthenate salt formation along an oil-water interface. Accordingly, the inhibitor composition may have a hydrophilic portion and an oleophilic portion. In one embodiment, the inhibitor composition includes the product formed by a reaction between phosphorus pentoxide and an alcohol.

In another embodiment, the inhibitor also acts along an oil-water interface such that any organic salt that does form will be rendered as an unstable interfacial film, after which the dispersed phase droplets will coalesce and a stable emulsion will not be formed.

In another embodiment, the inhibitor composition inhibits crystal growth of any salts of organic acids that do form, by the incorporation of any or all components of the composition into the crystal structure of the salt, thus reducing, or eliminating agglomeration of the salts, and preventing deleterious salt formation.

In still another embodiment, the inhibitor composition can contain active material that acts as a Brønsted acid, providing protons to the oil-water medium, and thus reducing the ionization of organic acids present. This proton-active material can be in the form of a typical acid species, or can be a surfactant or hydrotrope.

The inhibitor composition may be a surfactant, such as an anionic surfactant, amphoteric surfactant, or a combination thereof. More particularly, the surfactant may be selected from phosphates, sulfates, sulfonates, sulfosuccinates, polysulfosuccinates, phenols, betaines, thiocarbamates, xanthates and combinations thereof. It is believed that these inhibitor compositions concentrate along the oil-water interface, and also incorporate into metal carboxylate salt complexes and crystals. Preferably, the inhibitor composition is characterized by an inability to form organized phases, such as when the inhibitor composition includes at least one hydrotrope. A hydrotrope is sometimes defined as having a structure that is similar to that of a surfactant, such that both hydrophobic and hydrophilic groups exist in the same molecule. For a classical hydrotrope however, the hydrophobic moiety is shorter compared with that of a surfactant. A hydrotrope may also be referred to as a type of molecule that has both surfactant-like qualities and ionic solubilizer qualities, in that it acts to stabilize other surfactants so that they will remain soluble. Hydrotropes form mixed interfaces with surfactants, and act to effectively destabilize crystalline phases brought about by physical attractions of hydrophobic and hydrophilic surfactant moieties. The hydrotropes may be in an acid form, a salt form, or a combination thereof. A preferred hydrotrope includes a compound selected from a class of materials that form a mixed interface with surfactants. A most preferred hydrotrope includes monophosphate ester, diphosphate ester, or a combination thereof. One example of a preferred inhibitor composition includes a phosphate ester having an organic side chain comprising the product formed by a reaction between a fatty acid and up to 9 moles, for example 1 to 9 moles, of ethylene-oxide, propylene-oxide, butylene-oxide, or a combination thereof.

The inhibitor compositions of the invention are preferably added at a concentration of less than 500 ppm in the mixture of oil and water, more preferably at less than 250 ppm, even more preferably less than 120 ppm, and optionally even less than 50 ppm. Optionally, the inhibitor composition may further comprise acetic acid, but preferably less than 200 ppm acetic acid. However, it is preferable to provide the inhibitor composition in the absence of acetic acid. In one embodiment, the amount of inhibitor composition added to the oil and water mixture is effective to protonate naphthenate salts formed prior to the addition of the inhibitor composition. Preferably, the methods of the invention are characterized in that the pH of the oil and water mixture is greater than 5.2 following the addition of the inhibitor composition, more preferably greater than 6, and most preferably about 7.

The step of adding the inhibitor composition may include injecting the inhibitor composition downhole, dosing the inhibitor composition to an oil-water separator, or providing the inhibitor composition at another desirable point. Optionally, the inhibitor composition may be added as the oil and water mixture is being produced from a formation. Preferably, the inhibitor composition is added before a choke, manifold, turret, or a combination thereof. The method may include, after adding the inhibitor composition, reducing the pressure to release carbon dioxide gas from the oil. Optionally, the method may include reducing the pressure on the mixture to release carbon dioxide gas from the mixture before adding the inhibitor composition. Accordingly, the inhibitor composition may be added after a choke, manifold, turret, or a combination thereof.

DETAILED DESCRIPTION OF A PREFERRED EMBODIMENT

Figure 1:
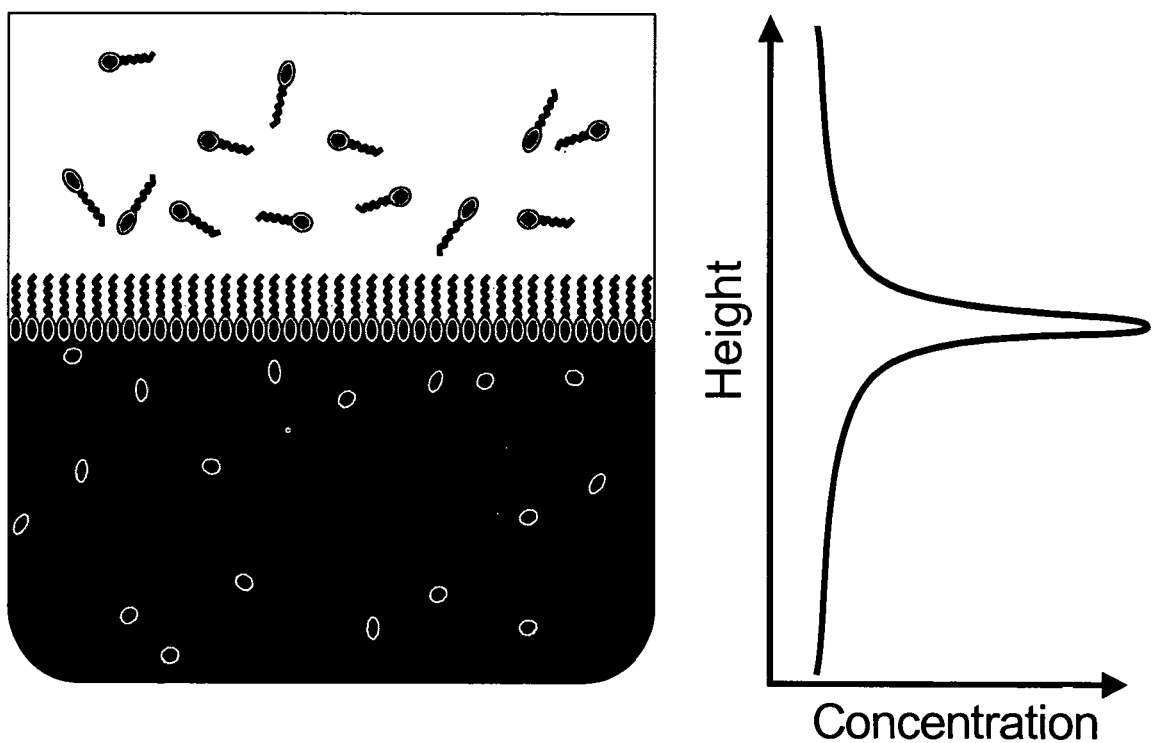
FIG. 1 is a schematic diagram showing surfactant molecules having a water-loving head and an oil-loving tail, where the molecules have self-associated and concentrated at an oil/water interface.

The present invention is directed to low dosage naphthenate inhibitor (LDNI) compounds and compositions including those compounds. These compounds are capable of inhibiting naphthenate salt formation, precipitation or emulsions at substantially lower dosage than with existing acetic acid practices. Preferred naphthenate inhibitor compounds include acids that are stronger than the carboxylic acids in the crude oil in order to protonate the weaker naphthenic acids. However, it is also preferred that the naphthenate inhibitor compounds are non-emulsifying. One particularly preferred class of these compounds includes hydrotropes. As used herein, the term "hydrotrope" means a compound having certain surfactant qualities that is less likely to form organized phases and therefore have a lower emulsifying tendency than many other surfactants. Accordingly, hydrotropes frequently have a hydrocarbon tail that is suitably shaped or bulky to prevent or interrupt the self organization of other surface active material. Hydrotropes may be used in their acid form or weak base salt form, but must be either water-soluble or oil-soluble. Anionic and amphoteric hydrotropes are deemed to be particularly useful in this invention.

However, it is believed that other surfactants that would not be classified as classical hydrotropes may also exhibit qualities that are beneficial in inhibiting naphthenate salt formation. These other surfactants may include both anionic surfactants and amphoteric surfactants. Examples of anionic surfactants include phosphates, phosphonates (such as $R_1NR_2R_3$, wherein $R_1$ is an organic moiety, and $R_2$ and $R_3$ are independently selected from —$(CH_2P(=O)(OH)_2)$ or H or an organic moiety; or salts of these phosphonates, or quaternary salts of these phosphonates) acrylic acids, sulfates, sulfonates, sulfosuccinates, polysulfosuccinates, betaines, thiocarbamates, xanthates and the like. Preferred naphthenate inhibitors also exhibit low corrosivity and will be compatible with other demulsifiers. Further still, it is preferred to use naphthenate inhibitors that are environmentally friendly, such as exhibiting biodegradability, no bioaccumulation, as well as low toxicity to marine species. Specific examples of suitable surfactants include, without limitation, phenols, carboxylic acids, betaines, thiocarbamates, xanthates, phosphonates, phosphate esters, sulfates, sulfonates, and sulfosuccinates and derivatives of these surfactants. Specific examples of phosphonates include mono-amine, di-amine, tri-amine, tetra-amine, penta-amine and other poly-amine phosphonates, as well as mono-alkyl, di-alkyl, and tri-alkyl phosphonates. Specific examples of acrylic acids include surface-active modified polyacrylic acids, as well as polyalkyl sulfosuccinates.

Preferred naphthenate inhibitor compositions include phosphate esters and sulphonic acids. Presently, the most preferred inhibitor composition includes a monophosphate ester, a diphosphate ester, or a combination thereof. These phosphate esters have been successfully used and shown to be approximately twenty times as effective as acetic acid per unit volume of inhibitor. Other successfully used or tested compositions include sulfonates, sulfosuccinates and ethoxylated fatty acids in combination with polymeric surfactants like poly-glycol esters, poly-imines and epon-resins.

Naphthenate inhibitor compositions comprising a phosphate ester may be made or obtained in various ways. For example, phosphate esters may be prepared from phosphorus chloride ($PCl_3$) or polyphosphoric acid. However, the presently most preferred method of forming the phosphate ester-based naphthenate inhibitors includes the reaction of phosphorus pentoxide with alcohols (ROH) to generate the mono-alkyl and di-alkyl (aryl or mixed alkyl/aryl) phosphonic acid. Alcohols (ROH) of the class alkyl, aryl substituted aryl having linear, branched, cyclic and substituted cyclic structures including their oxyalkylated derivatives containing 1 to 9 moles ethylene oxide (EO), propylene oxide (PO) or butylene oxide (BO) and/or mixtures thereof, in block or random form, per hydroxyl can be beneficial in producing naphthenate salt inhibitors. This reaction yields one mole of monophosphate ester (R—O—P(=O)(OH)$_2$) and one mole of diphosphate ester ((R—O)$_2$—P(=O)(OH)). This reaction product can be used as a naphthenate inhibitor without further modification or purification of the active ingredients.

Hydrotropes and suitable surfactants of the present invention are preferably added to production or processing streams containing oil and water in an amount effective to inhibit naphthenate salt formation, precipitation or emulsions. The naphthenate inhibitor compositions are effective at concentrations less than the dose rate required of acetic acid. While it is recognized that the necessary dosage of a naphthenate inhibitor will vary based on the composition of the crude oil and the composition of the connate or process water, it is generally unnecessary to use more than 200 ppm of the present naphthenate inhibitors even in the absence of acetic acid. A preferred naphthenate inhibitor dosage is 100 ppm or less based on total fluids. The naphthenate inhibitors are also used at concentrations of 50 ppm or less in combination with a reduced dosage of acetic acid. In fact, a concentration of about 40 ppm of a mixture of monophosphate ester and diphosphate ester has been shown to be effective in combination with acetic acid, while reducing the typical acetic acid dosage by about 70% to 100 ppm or less.

The present invention also provides a method of inhibiting, dissolving, or dispersing calcium naphthenate salts or other naphthenate salts that can form precipitates or emulsions during crude oil production or processing. The method includes adding an effective amount of a naphthenate inhibitor into the production fluids for contact with mixtures of oil and water in the formation, the production equipment, or processing systems. It is believed that the naphthenate inhibitors of the present invention exhibit surface-active properties that cause the inhibitors to self-associate and concentrate in a layer at the oil-water interface. Having the naphthenate inhibitors at the oil-water interface serves to prevent interactions between organic acids in the oil phase with monovalent, di-valent and/or poly-valent cations or cation complexes in the water. It is believed that the physical positioning and geometry of the naphthenate inhibitor composition blocks formation and/or limits growth of naphthenate salts. However, it is preferred that the naphthenate inhibitors also do not cause formation of stable oil-in-water and water-in-oil emulsions.

The present naphthenate inhibitor compounds provide the advantages of using lower dosages of chemicals and avoiding the corrosivity that comes with operating at lower pH. Improvements in inhibitor logistics and reduction of treatment costs are significant.

The naphthenate inhibitors are dosed in the oil/water mixtures (emulsions) as the mixtures are produced from the formation. The best dosage point or injection point is just before the pressure is released from the fluids, such as just before a choke, the manifold, the turret or any other place where the pressure drops significantly. Also, it is possible to successfully inject or provide a naphthenate inhibitor at a point immediately downstream of fluid pressure release. Naphthenate deposits or emulsions are typically formed after the pressure on the fluid is released from the system, because carbon dioxide gas ($CO_2$) will escape from the fluid at reduced pressures, resulting in an increased pH and the formation of naphthenate salts. Preferably, the naphthenate inhibitor is injected into the fluid prior to formation of the naphthenate salts, although injection following naphthenate salt formation may also be successful.

The invention has been described as a low dosage naphthenate inhibitor (LDNI), but the compounds are believed to have equal or similar utility for inhibiting the formation of other insoluble organic salts or soaps of organic acids present in oil. The term "soap" is classically defined as any salt of a fatty acid. Such an organic acid can be varied in its functionality and carbon chain length, examples of which include, but are not limited to, the sodium salt of stearic acid and the sodium salt of oleic acid.

Surfactants, or surface-active chemicals, comprise generally contrasting character in the same molecule. FIG. 1 is a schematic diagram showing surfactant molecules having a water-loving head and an oil-loving tail, where the molecules have self-associated and concentrated at an oil/water interface. Careful measurement of surfactant monomer populations below the critical micelle concentration shows that the concentration of surfactant at the oil/water interface is greater than in either the bulk oil or the bulk water phases. Of course, as the bulk concentration of surfactant increases, approaching and exceeding the critical micelle concentration, surfactant aggregates of various shapes and sizes can form, and the bulk concentration may exceed the concentration at the interface. Nevertheless, the surfactant interface will remain as a recognizable structural and chemical line of demarcation between the aqueous and oil phases. The nature of the water-loving head group of the surfactant can be engineered to determine its interaction with species in the aqueous environment. The nature of the tail can also be engineered to impart particular desired properties. Combining these two parameters carefully provides a material having a greater propensity to concentrate itself at interfaces. These low dosage naphthenate inhibitors are far more effective than mere acidification for inhibiting naphthenic acids from interacting with cations in the water, and also for inhibiting the formation of problematic insoluble aggregates as the metal salts. Thus, it is possible to design low dosage naphthenate inhibitors that can inhibit solid calcium naphthenate deposit formation, prevent the formation of insoluble organic salts and soaps and/or prevent the stabilization of emulsions. Low dosage naphthenate inhibitors are far more cost-effective than conventional treatment programs, since these low dosage naphthenate inhibitors self associate in high concentrations at water/oil interfaces to combat the formation and effects of organic acid-derived salts and soaps that can lead to deposits or stabilization of emulsions.

The fact that the bulk concentration of these low dosage naphthenate inhibitors can be very low, yet provide a sufficient interfacial concentration of the inhibitors to be effective, reduces the extent to which the bulk pH is typically lowered in comparison to the use of conventional calcium naphthenate treatment programs, such as large additions of acetic acid. However, there may be circumstances in which localized surfactant aggregates such as micelles, admicelles, and other self-assembled species or phases are present in the continuous or dispersed phases of the system due to electrolyte effects, pressure, temperature, presence of dissolved gas, and the like.

While the methods and compositions of the invention are not so limited, it is believed that the inhibitor compositions are attracted to the oil-water interface (See FIG. 1), and may be described in terms of a monolayer concentration or surface excess concentration, such as in units of moles per square centimeter of oil-water interface, as an alternative to bulk concentration, which is typically reported as a molar concentration. A preferred surface excess concentration is between about $0.5 \times 10^{-10}$ and about $7.5 \times 10^{-10}$ moles per square centimeter. However, since the actual surface area of the oil-water interface is rarely known and typically dynamic over time, it may be more practical to quantify the amount of inhibitor used is terms of a dosage rate, i.e., the amount of inhibitor used per unit volume of the oil-water mixture. For example, the inhibitor may be added to a production fluid having a mixture of oil and water at a dosage rate of between 25 and 1000 ppm inhibitor. However, in accordance with the teaching of this invention, it should be recognized that the dosage rate will be unlikely to ultimately result in a bulk concentration of the same magnitude, since the inhibitor will preferentially concentrate at oil-water interfaces.

The surfactant molecules depicted in FIG. 1 are not limited to classical surfactant structures, but can also consist of classical hydrotrope molecules. Furthermore, the interface can be a mixed system of surfactant and hydrotrope molecules. Still further, the interface can be a mixed system of surfactant, hydrotrope, and organic acid metal ion salts. Within the scope of this invention, the interface can be described as either: a barrier that prevents organic acids and ionized organic acids in the oil phase from combining with metal ions in the aqueous phase; a destabilized liquid particle interface, which when two particles collide, they will coalesce and become non-emulsified due to the destabilized interface; or a combination thereof.

It should be recognized that the discussion of an oil-water interface throughout this document, include oil-water interfaces of various types, geometries and configurations, specifically including water-in-oil emulsions, oil-in-water emulsions, oil-in-water-in-oil emulsions, water-in-oil-in-water emulsions, microemulsified systems, and any other emulsion systems or interfaces recognized now or discovered in the future. The invention is not limited to an oil-water interface of any particular type, geometry or configuration. Furthermore, the examples that follow should not be taken to limit the scope of the invention, but merely represent specific applications of the invention.

EXAMPLES

Example 1

A solution was prepared as a surrogate for connate water by combining 1% calcium chloride and 2.5% sodium chloride in water and adjusting the pH to 8. Another solution was prepared as a surrogate for crude oil by combining 1% naphthenic acid in aliphatic hydrocarbons. 50 ml of each solution was combined and shaken for five minutes. Upon standing, a thick oil-in-water emulsion was observed, apparently stabilized against droplet coalescence by a layer of calcium naphthenate at the interface of each droplet.

Example 2

A connate water surrogate solution and a crude oil surrogate solution were prepared as described in Example 1. 50 ml of each solution was combined. However, before shaking, 500 ppm of acetic acid was added to the combination of surrogate solutions. All of the fluids were then shaken together for five minutes. Upon standing, the fluids separated easily with no apparent emulsions or calcium naphthenate solids. The pH was measured at 5.2.

Example 3

A connate water surrogate solution and a crude oil surrogate solution were prepared as described in Example 1. 50 ml of each solution was combined. However, before shaking, 40 ppm of a mixture of monophosphate ester and diphosphate ester and 100 ppm of acetic acid were added to the combination of surrogate solutions. All of the fluids were then shaken together for five minutes. Upon standing, the fluids separated easily with no apparent emulsions or calcium naphthenate solids. The pH was measured at 7.0.

Example 4

A connate water surrogate solution and a crude oil surrogate solution were prepared as described in Example 1. 50 ml of each solution was combined. However, before shaking, 100 ppm of a mixture of monophosphate ester and diphosphate ester was added to the combination of surrogate solutions. All of the fluids were then shaken together for five minutes. Upon standing, the fluids separated easily with no apparent emulsions or calcium naphthenate solids. The pH was measured at 7.0.

Example 5

A naphthenate salt inhibitor solution containing a phosphate ester was prepared. A linear fatty alcohol having 9 to 11 carbon atoms was reacted with ethylene oxide at molar ratios of 9, 6, and 3, respectively. The three resulting reaction products were then further reacted with phosphorus pentoxide at a molar ratio of about 0.5. The final products were believed to each contain a mixture of monophosphate ester and diphosphate ester, albeit having different side chain lengths. Each of the three products were shaken at 50 ppm concentration for 5 minutes with 50 ml of the connate water surrogate and 50 ml of the crude oil surrogate described in Example 1. Upon standing, each of the three bottles showed no calcium naphthenate solids. It was noticed that the alkyl groups with increasing oxide content tended to create increased quantities of emulsion. The pH was greater than 6.

Example 6

A naphthenate salt inhibitor solution containing a phosphate ester was prepared. 2-ethyl hexanol was reacted with phosphorus pentoxide at a molar ratio of about 0.5. The final product was believed to contain a mixture of monophosphate ester and diphosphate ester. The product was shaken at a concentration of 50 ppm for 5 minutes with 50 ml of the connate water surrogate and 50 ml of the crude oil surrogate described in Example 1. Upon standing, the bottle showed no calcium naphthenate solids and no evidence of emulsions. The pH was greater than 6.

The term "inhibit" as used herein means to restrain from full and free occurrence of some act or event, and is not limited to a definite and known degree of restraint. Accordingly, it should be recognized that the use of a composition to "inhibit" interaction between cations and organic acids does not mean that a given amount of the composition will necessarily produce a direct, measurable and known change in the interaction, since other factors may change in a manner that offsets the use of the composition. For example, a crude oil having a low TAN number, such as less than 0.3, or a water stream having a low concentration of calcium or magnesium ions may have little tendency to interact and form naphthenate salts even without use of an inhibitor composition. By contrast, a crude oil having a high TAN number and water having a high calcium or magnesium ion concentration may produce a significant amount of precipitates or emulsions. While the use of an inhibitor composition will reduce the degree of formation of naphthenate salts and the resulting precipitates or emulsions, the naphthenate salt concentration may still be higher than in the production fluids of low TAN crude. Still, the naphthenate salt-content in the production fluid of a high TAN crude oil will be inhibited, or any adventitious salts that do form will be mitigated, with use of an inhibitor composition relative to the naphthenate salt-content in the production fluid of the same crude oil without an inhibitor composition.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. For example, the phrase "solution comprising a hydrocarbon-containing compound" should be read to describe a solution having one or more hydrocarbon-containing compound. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

It should be understood from the foregoing description that various modifications and changes may be made in the preferred embodiments of the present invention without departing from its true spirit. It is intended that this foregoing description is for purposes of illustration only and should not be construed in a limiting sense. Only the language of the following claims should limit the scope of this invention.

What is claimed is:

1. A method comprising:
   supplying at least one surface active compound into a mixture of divalent cation-containing water and organic acid-containing oil at a dosage rate that is effective to self-associate at interfaces between the water and oil and inhibit formation of divalent cation salts of the organic acid, wherein the compound is added before a choke, manifold, turret, or a combination thereof; and
   after supplying the compound into the mixture, reducing the pressure to release carbon dioxide gas from the oil.

2. The method of claim 1, wherein the organic acid includes naphthenic acid.

3. The method of claim 2, wherein the compound inhibits formation of naphthenate salts.

4. The method of claim 1, wherein the dosage rate of the at least one surface active compound is between 10 and 1000 ppm.

5. The method of claim 1, wherein the dosage rate of the at least one surface active compound is between 10 and 100 ppm.

6. The method of claim 1, wherein the dosage rate of the at least one surface active compound is between 10 and 60 ppm.

7. The method of claim 1, wherein the dosage rate of the at least one surface active compound is between 25 and 50 ppm.

8. The method of claim 1, wherein the divalent cation salts of the organic acid are capable of forming deposits, stabilizing emulsions, or a combination thereof.

9. The method of claim 1, wherein the mixture of water and oil includes an emulsion.

10. The method of claim 1, wherein the pH of the oil and water mixture is greater than 5.2 following the addition of the compound.

11. The method of claim 1, wherein the pH of the oil and water mixture is greater than 6 following the addition of the compound.

12. The method of claim 1, wherein the pH of the oil and water mixture is greater than 6.5 following the addition of the compound.

13. The method of claim 12, wherein the organic acid includes naphthenic acid.

14. The method of claim 13, wherein the compound inhibits formation of naphthenate salts.

15. The method of claim 1, wherein the compound inhibits formation of organic soap deposits or organic soap emulsions by inhibiting cations in the water from interacting with organic acid in the oil.

16. The method of claim 1, wherein the compound inhibits the cations and organic acid from interacting along the interface between the water and oil.

17. The method of claim 1, wherein the water has a cation concentration of greater than 100 ppm.

18. The method of claim 1, wherein the divalent cations are selected from calcium, magnesium, and combinations thereof.

19. The method of claim 1, wherein the organic-acid-containing oil has a total acid number greater than 0.5.

20. The method of claim 1, wherein the oil contains naphthenic acid.

21. The method of claim 1, wherein the oil contains napthenic acid at a concentration greater than 100 ppm.

22. The method of claim 1, further comprising:
   producing the mixture of water and oil from a subterranean formation.

23. The method of claim 22, further comprising:
   releasing carbon dioxide gas from the mixture.

24. The method of claim 22, further comprising:
breaking an emulsion of the water and oil.

25. The method of claim 24, further comprising:
adding an emulsion breaker composition into the produced mixture.

26. The method of claim 24, further comprising:
physically breaking the emulsion.

27. The method of claim 1, wherein the compound has a hydrophilic portion and an oleophilic portion.

28. The method of claim 27, wherein the compound is a surfactant.

29. The method of claim 28, wherein the surfactant is selected from anionic surfactants, amphoteric surfactants, and combinations thereof.

30. The method of claim 28, wherein the surfactant is selected from phosphates, sulfates, sulfonates, sulfosuccinates, polysulfosuccinates, phenols, betaines, thiocarbamates, xanthates and combinations thereof.

31. The method of claim 27, wherein the compound concentrates along the oil-water interface.

32. The method of claim 31, wherein the at least one surface active compound includes at least one hydrotrope.

33. The method of claim 32, wherein the hydrotope is in an acid form, a salt form, or a combination thereof.

34. The method of claim 32, wherein the at least one hydrotrope includes a monophosphate ester compound, a diphosphate ester compound, or a combination thereof.

35. The method of claim 1, wherein the compound includes the product formed by a reaction between phosphorus pentoxide and an alcohol.

36. The method of claim 1, wherein the compound includes a phosphate ester having an organic side chain comprising the product formed by a reaction between a fatty acid and 1 to 9 moles of ethylene oxide, propylene oxide, butylene oxide, or combinations thereof.

37. The method of claim 36, wherein the butylene oxide is 1,2 butylene oxide.

38. The method of claim 1, wherein the water is connate water or formation water.

39. The method of claim 1, wherein the compound is added at a concentration of less than 500 ppm in the mixture of oil and water.

40. The method of claim 1, wherein the compound is added at a concentration of less than 250 ppm in the mixture of oil and water.

41. The method of claim 1, wherein the compound is added at a concentration of less than 120 ppm in the mixture of oil and water.

42. The method of claim 1, wherein the compound is added at a concentration of less than 100 ppm in the mixture of oil and water.

43. The method of claim 1, wherein the compound is added at a concentration of less than 50 ppm in the mixture of oil and water.

44. The method of claim 41, wherein the compound further comprises acetic acid.

45. The method of claim 43, wherein the compound further comprises less than 200 ppm acetic acid.

46. The method of claim 41, wherein the compound is provided in the absence of acetic acid.

47. The method of claim 1, wherein the water is selected from connate water, seawater, and combinations thereof.

48. The method of claim 1, wherein the step of adding the compound includes injecting the compound downhole.

49. The method of claim 1, wherein the step of adding the compound includes dosing the compound to an oil-water separator.

50. The method of claim 1, further comprising:
adding the compound as the oil and water mixture is being produced from a formation.

51. The method of claim 1, wherein the oil has a TAN greater than 0.05.

52. The method of claim 1, wherein the amount of the compound added to the oil and water mixture is effective to protonate naphthenate salts formed prior to the addition of the compound.

53. The method of claim 1, wherein the compound is an acid.

54. The method of claim 1, wherein the compound forms a mixed interface with surfactants or organic acid metal ion salts.

55. The method of claim 1, wherein the compound modifies the crystal habit of the divalent cation salts of the organic acid.

56. A method comprising:
supplying a compound into a conduit comprising a flowing mixture of cation-containing water and an organic-acid-containing oil, wherein the compound is added before or after a choke, manifold, turret or combination thereof, wherein the compound self-associates at an interface between the water and oil to inhibit the formation of organic soap and salt deposits or precipitates, and wherein the pressure on the flowing mixture is reduced after the choke, manifold, turret or combination thereof to release carbon dioxide gas from the oil.

57. The method of claim 56, wherein the compound is supplied by injection into the conduit.

58. The method of claim 56, wherein the conduit is selected from a drill string, casing, offshore riser, transport pipeline, processing pipe, and combinations thereof.

59. The method of claim 56, wherein the compound is supplied into the conduit by injection into an oil-containing formation that is in fluid communication with the conduit.

60. The method of claim 56, wherein the compound is a surfactant.

61. The method of claim 60, wherein the surfactant is selected from phosphates, sulfates, sulfonates, sulfosuccinates, polysulfosuccinates, phenols, betaines, thiocarbamates, xanthates and combinations thereof.

62. The method of claim 56, wherein the at least one surface active compound includes at least one hydrotrope.

63. The method of claim 62, wherein the at least one hydrotrope includes a monophosphate ester compound, a diphosphate ester compound, or a combination thereof.

64. The method of claim 56, wherein the compound includes a phosphate ester having an organic side chain comprising the product formed by a reaction between a fatty acid and 1 to 9 moles of ethylene-oxide, propylene-oxide, butylene-oxide, or combinations thereof.

65. The method of claim 56, wherein the water is connate water or formation water.

66. The method of claim 56, wherein the compound is added at a concentration of less than 100 ppm in the mixture of oil and water.

67. A method comprising:
injecting at least one surface active compound into a mixture of water and oil, wherein the at least one surface active compound includes at least hydrotrope selected from the group consisting of monophosphate ester compounds, diphosphate ester compounds, and combinations thereof, and wherein the compound self-associates at interfaces between the water and oil to inhibit the formation of organic soaps and organic soap deposits or precipitates.

68. The method of claim 67, wherein the compound includes a phosphate ester having an organic side chain comprising the product formed by a reaction between a fatty acid and 1 to 9 moles of ethylene-oxide, propylene-oxide, butylene-oxide, or combinations thereof.

69. The method of claim 67, wherein the water is connate water or formation water.

70. The method of claim 67, wherein the compound is added at a concentration of less than 100 ppm in the mixture of oil and water.

71. A method comprising:
injecting at least one surface active compound into a mixture of water and oil, wherein the at least one surface active compound includes at least hydrotrope selected from the group consisting of monophosphate ester compounds, diphosphate ester compounds, and combinations thereof, and wherein the compound self-associates at an interface between the water and oil to inhibit a component in the water from interacting with a component of the oil.

72. The method of claim 71, wherein the mixture of water and oil is an oil production fluid.

73. The method of claim 71, wherein the compound includes a phosphate ester having an organic side chain comprising the product formed by a reaction between a fatty acid and 1 to 9 moles of ethylene-oxide, propylene-oxide, butylene-oxide, or combinations thereof.

74. The method of claim 71, wherein the water is connate water or formation water.

75. The method of claim 71, wherein the compound is added at a concentration of less than 100 ppm in the mixture of oil and water.

76. In a method for reducing the tendency of organic-acid in oil to form divalent metal salt complexes when mixed with water containing divalent metal cations, the improvement comprising:
supplying at least one surface active compound into the mixture of oil and water at a dosage rate that is effective to inhibit formation of divalent cation salts of the organic acid without raising the pH above 6.5, wherein the compound is added before or after a choke, manifold, turret or combination thereof, and wherein the pressure on the flowing mixture is reduced after the choke, manifold, turret or combination thereof to release carbon dioxide gas from the oil.

77. The method of claim 76, wherein the at least one surface active compound includes a surfactant selected from phosphates, sulfates, sulfonates, sulfosuccinates, polysulfosuccinates, phenols, betaines, thiocarbamates, xanthates and combinations thereof.

78. The method of claim 76, wherein the at least one surface active compound includes at least one hydrotrope.

79. The method of claim 78, wherein the at least one hydrotrope includes a monophosphate ester compound, a diphosphate ester compound, or a combination thereof.

80. The method of claim 76, wherein the water is connate water or formation water.

81. The method of claim 76, wherein the compound is added at a concentration of less than 100 ppm in the mixture of oil and water.

82. A method comprising:
reducing the pressure on a mixture of divalent cation-containing water and organic acid-containing oil to release carbon dioxide gas from the mixture; and then
supplying at least one surface active compound into the mixture at a dosage rate that is effective to self-associate at interfaces between the water and oil and inhibit formation of divalent cation salts of the organic acid, wherein the compound is supplied after a choke, manifold, turret, or a combination thereof.

* * * * *